(12) United States Patent
Kodama (10) Patent No.: US 7,346,488 B2
(45) Date of Patent: Mar. 18, 2008

(54) AUTOMATIC TRANSLATOR AND COMPUTER-READABLE STORAGE MEDIUM HAVING AUTOMATIC TRANSLATION PROGRAM RECORDED THEREON

(75) Inventor: Syuuzi Kodama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1273 days.

(21) Appl. No.: 09/813,162

(22) Filed: Mar. 21, 2001

(65) Prior Publication Data
US 2002/0035466 A1    Mar. 21, 2002

(30) Foreign Application Priority Data
Jul. 10, 2000    (JP) .............................. 2000-207714

(51) Int. Cl.
G06F 17/28 (2006.01)
G10L 21/00 (2006.01)

(52) U.S. Cl. ............................. 704/4; 704/2; 704/277
(58) Field of Classification Search ................ 704/2–7, 704/9, 8
See application file for complete search history.

(56) References Cited

U.S. PATENT DOCUMENTS

| | | | | | |
|---|---|---|---|---|---|
| 4,624,012 | A | * | 11/1986 | Lin et al. ..................... | 704/261 |
| 4,703,425 | A | * | 10/1987 | Muraki ........................... | 704/7 |
| 4,833,611 | A | * | 5/1989 | Fukumochi et al. ........... | 704/5 |
| 5,010,486 | A | * | 4/1991 | Suzuki et al. .................. | 704/5 |
| 5,225,981 | A | * | 7/1993 | Yokogawa ...................... | 704/2 |
| 5,321,606 | A | * | 6/1994 | Kuruma et al. ................ | 704/9 |
| 5,617,507 | A | * | 4/1997 | Lee et al. ..................... | 704/200 |
| 5,619,410 | A | * | 4/1997 | Emori et al. ................... | 704/7 |
| 5,717,823 | A | * | 2/1998 | Kleijn ........................ | 704/220 |
| 5,842,159 | A | * | 11/1998 | Nakamura et al. ............. | 704/4 |
| 5,884,253 | A | * | 3/1999 | Kleijn ........................ | 704/223 |
| 5,895,446 | A | * | 4/1999 | Takeda et al. ................. | 704/2 |
| 6,374,224 | B1 | * | 4/2002 | Horiguchi et al. .......... | 704/266 |
| 6,442,524 | B1 | * | 8/2002 | Ecker et al. ................ | 704/277 |

FOREIGN PATENT DOCUMENTS

| | | |
|---|---|---|
| JP | 64-31269 | 2/1989 |
| JP | 10-97530 | 4/1998 |
| WO | 99/57651 | 11/1999 |

OTHER PUBLICATIONS

Japanese Patent Office Action, mailed Jan. 16, 2007, and issued in corresponding Japanese Patent Application No. 2001-189187.

* cited by examiner

*Primary Examiner*—David Hudspeth
*Assistant Examiner*—Brian L. Albertalli
(74) *Attorney, Agent, or Firm*—Staas & Halsey LLP (57) ABSTRACT

An original inputted to an original inputting unit is divided to morphemes. A sequence of the divided morphemes is converted to conceptual categories. A typical sentence verifying unit verifies whether or not a string of predetermined conceptual categories exists in the sequence of the converted conceptual categories. When the string of predetermined conceptual categories exists in the sequence of the converted conceptual categories, a replacing unit generates a pattern of a predetermined translated sentence corresponding to the string of the conceptual categories and replaces the pattern of the predetermined translated sentence with translated words corresponding to the original morphemes of the conceptual categories constituting the pattern of the translated sentence.

5 Claims, 3 Drawing Sheets

AUTOMATIC TRANSLATOR AND COMPUTER-READABLE STORAGE MEDIUM HAVING AUTOMATIC TRANSLATION PROGRAM RECORDED THEREON

BACKGROUND OF THE INVENTION

1. Field of the Invention

The entire contents of Japanese Patent Application No. 2000-207714 filed on Jul. 10, 2000 are incorporated herein by reference.

The present invention relates to an automatic translator and more particularly to an automatic translator that performs translation of a predetermined typical sentence by searching a table that stores a translated sentence corresponding to the typical sentence. The present invention also relates to a computer-readable storage medium having an automatic translation program recorded thereon.

2. Description of the Related Art

Figure 1:
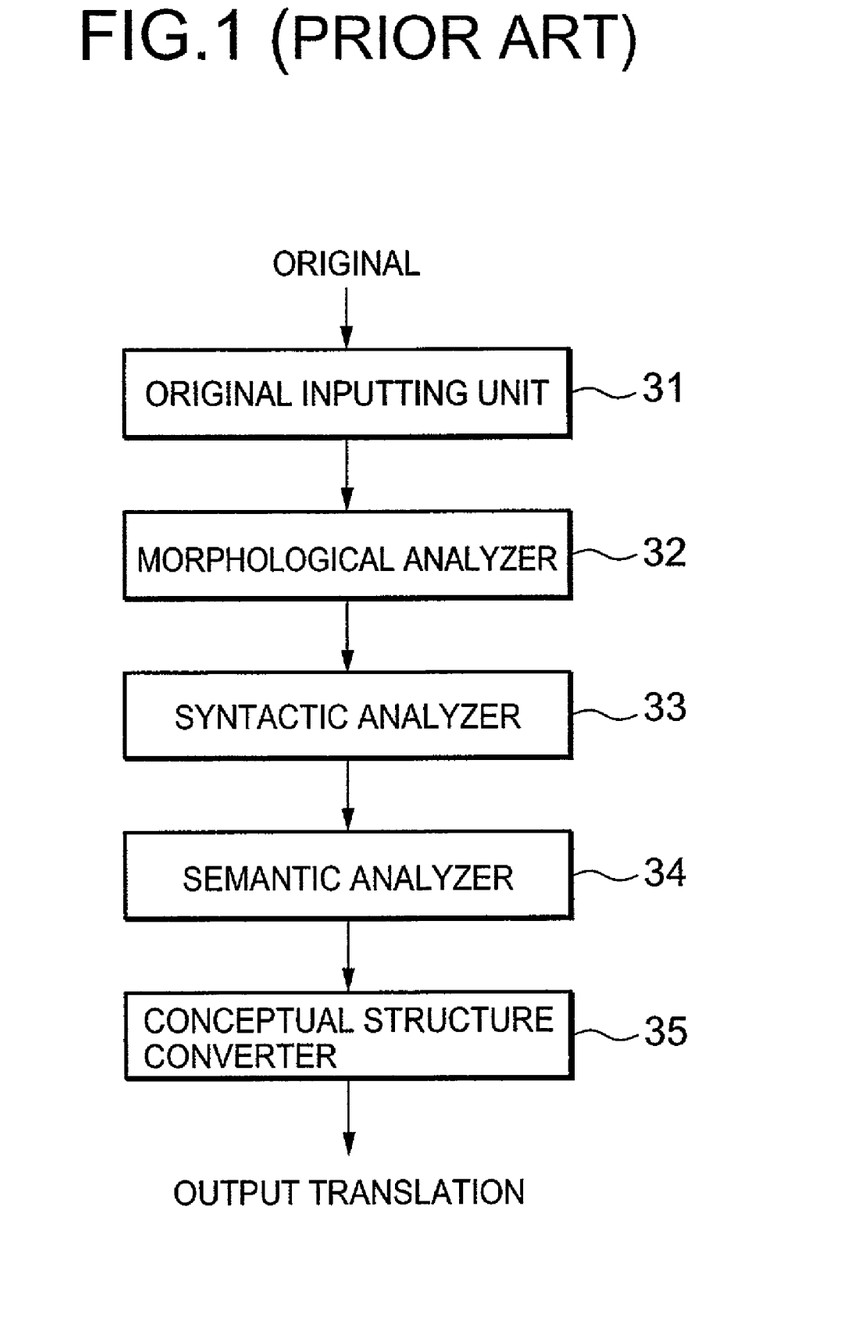
FIG. 1 is a block diagram illustrating a configuration of a conventional typical automatic translator.

The conventional automatic translator uniformly provides analytical processing to the entirety of an original to be translated. FIG. 1 is a block diagram illustrating a configuration of a conventional typical automatic translator. As illustrated in the figure, in conventional, the entirety of the original is sequentially inputted to an original inputting section 31, and the inputted original is divided into morphemes by a morphological analyzer 32. Thereafter, a sequence of morphemes is subjected to analytical processing by a syntactic analyzer 33, a semantic analyzer 34, and a conceptual structure converter 35 in order.

Namely, the original to be translated is divided into the morphemes by the morphological analyzer 32. Thereafter, the translation is carried out without exception by the syntactic analyzer 33 and afterward, which are deep-level analytical units.

Regarding the case in which the original is the typical sentence and the translation result can be decided based on only the simple corresponding relationship with the original, the aforementioned conventional translation processing results in overspecialization obviously.

In other words, since the length of the original subjected to analytical processing by a deeper-level analytical unit is little shortened, there is a possibility that erroneous translation, which is substantially proportional to the length of the original, may occur, or processing time required for translation is not reduced.

In accordance with the explosion in the widespread use of the Internet, the automatic translator has been often used in browsing E-mail or home page. In such a case, the original whose translation result can be decided based on only the simple corresponding relationship is frequently included as a given translation object. To name a representative example, there is a character string indicative of date and time, and a day of the week as in "Thu, 09 Jul. 1988 07:49:30-0700."

A plurality of patterns can be present in such a character string, and they are stereotyped and have strong regularity. More specifically, such character string is nothing but a meaningless list of words, which are equivalent to nouns, and has no structure such as a phase and a clause as in the normal sentence.

It is obvious overspecialization to execute each processing of the syntactic analyzer 33, semantic analyzer 34, and conceptual structure converter 35 illustrate in FIG. 1 when the above-mentioned character string is inputted. For this reason, there is always possibility that erroneous analysis will occur, and this is unfavorable in view of the translation speed.

While, Japanese Patent Unexamined Publication No. 64-31269 discloses a translation apparatus, which comprises a translated word specifying memory that stores a word specified by an operator and its translation, for generating a translated sentence using a specific translated word corresponding to the word of the original, which is stored in the translated word specifying memory by referring to the translated word specifying memory at a translation executing time.

However, the translation apparatus disclosed in the above publication shows translation processing, which is based on word-to-word simple correspondence and provides no such processing that detects a string of predetermined morphemes (generally, corresponding to a plurality of words in the original) from the sequence of morphemes, and describes a user interface having the necessity for an operator to carry out translated-word registration processing beforehand.

SUMMARY OF THE INVENTION

An object of the present invention is to provide an automatic translator capable of executing high-speed analytical processing to a typical sentence by a pattern matching method, and to provide a computer-readable storage medium having an automatic translation program recorded thereon.

According to a first aspect of the present invention, there is provided an automatic transfer comprising an original inputting unit for inputting an original to be translated; a morphological analyzer for dividing a sequence of morphemes from the original inputted by the original inputting unit; a converter for converting the morphemes to conceptual categories to be output; a typical sentence verifying unit for verifying whether or not a string of predetermined typical conceptual categories exists in a sequence of the conceptual categories outputted from the converter; and a replacing unit for generating a pattern of a predetermined translated sentence corresponding to the string of the conceptual categories to replace the pattern of the predetermined translated sentence with translated words corresponding to the original morphemes of the conceptual categories constituting the pattern of the translated sentence when the string of predetermined typical conceptual categories exists in the sequence of the conceptual categories is determined by the typical sentence verifying unit.

According to the first aspect, when a character string, indicative of time and date and a day of the week, for example, "Thu, 09 Jul. 1998 07:49:30-0700" is input from the original inputting unit, the morphological analyzer performs the morphological analysis, so that the character string is converted to the morphemes, that is, ⌈Thu⌋ ⌈,⌋ ⌈July⌋ ⌈1998⌋ ⌈07:49:30⌋ ⌈-0700⌋.

The sequence of the morphemes can be originally regarded as a train of notations, which is obtained by dividing the original character string in a minimum semantic unit in view of the outline, and as a train of conceptual categories in view of the meaning. The conceptual categories are herein referred to as predetermined categories of classification destination where the morphemes are classified depending on the conception, that is, a kind of semantic information.

The conversion from the morphemes to the conceptual categories results in that the divided morphemes are checked against the vocabulary information file, which is formed of a specific library, to be extracted as conceptual categories. In the vocabulary information file, a definition is given to predetermined conceptual category (for example, a denotative definition that lists all elements and a connotative definition that describes restriction which each element should satisfy). Then, in a case where a target morpheme satisfies condition of each definition, the conceptual category defined by the definition is extracted.

Accordingly, if there is provided a user interface in which a user can freely define the conceptual categories in the vocabulary information file, the automatic translation of the typical sentences in various kinds of fields can be carried out by the present configuration.

According to the present configuration, the converter converts the morphemes, which are divided to ⌈Thu⌋ ⌈,⌋ ⌈July⌋ ⌈1998⌋ ⌈07:49:30⌋ ⌈-0700⌋, to the conceptual categories indicative of semantic information (for example, ⌈Thu⌋→ [abbreviated day of the week]). Then, the typical sentence verifying unit verifies whether or not the sequence of the categories has a fixed regularity, that is, there is the string of the predetermined typical conceptual categories in the sequence of the conceptual categories. Assuming that the typical sentence verifying unit verifies that the specific pattern matching, [abbreviated day of the week] [comma] [day] [abbreviated month] [year written by four digits] . . . is found out from some patterns prepared. The replacing unit generates the pattern of the predetermined translated sentence (the pattern that is [year written by four digits] year [abbreviated month] month [day] day [abbreviated day of the week] according to the above example) corresponding to the string of the conceptual categories. The replacing unit also replaces the pattern of the predetermined translated sentence with translated words (translated words that are 1998年(nen) 07 月(gatsu) 09 日(nichi) (木) (moku) according to the above example) corresponding to the original morphemes (⌈1998⌋ ⌈Jul.⌋ ⌈09⌋ ⌈Thu⌋ according to the above example) of the conceptual categories constituting the pattern of the translated sentence.

Moreover, the typical sentence verifying unit has a first table that stores a pair of the string of the predetermined conceptual categories and the pattern of the predetermined translated sentence corresponding to the string. Then, the typical sentence verifying unit verifies whether or not there is the string of the typical conceptual categories by performing the pattern matching between this table and the sequence of the conceptual categories.

While, the replacing unit has a second table that stores a pair of the morpheme constituting the pattern of the translated sentence and the predetermined translated word corresponding to the morpheme. The replacing unit generates the pattern of the predetermined translated sentence corresponding to the string of the conceptual categories using the first table, and replaces the pattern of the predetermined translated sentence with the translated words corresponding to the original morphemes of the conceptual categories constituting the pattern of the translated sentence.

In addition to the vocabulary information file, there is provided a configuration such that the user can freely set the pair of the string of the predetermined conceptual categories and the pattern of the predetermined translated sentence corresponding to the string using the first table and the pair of the morpheme constituting the pattern of the translated sentence and the predetermined translated word corresponding to the morpheme using the second table. This makes it possible to carry out the automatic translation of the typical sentences in various kinds of fields by the present configuration.

In the generation of the pattern of the translated sentence by the replacing unit, the string of the morphemes is changed in a predetermined order as required and a necessary subscription is added at this time. It is assumed that there is a character string indicative of the time and date and the day of the week, for example, "Thu, 09 Jul. 1988. " In this case, beside the simple replacement of ⌈(木) (moku), 09 Jul. 1998⌋, the string of the morphemes is changed and the subscript is added thereto. The change of word order as in ⌈1998 年(nen) 07 月(gatsu) 09 日(nichi) (木) (moku) ⌋ makes the meaning understandable as Japanese. Accordingly, at the time of generating the pattern of the translated sentence, the pattern of [year written by four digits] year [abbreviated month] month [day] day [abbreviated day of the week] is generated in the above example. This pattern is replaced with the translated words corresponding to the original morphemes of the conceptual categories constituting the pattern of the translated sentence based on this generated pattern, whereby the translation of ⌈1998 年(nen) 07 月(gatsu) 09 日(nichi) (木) (moku) ⌋is executed.

According to a second aspect of the present invention, there is provided a computer-readable storage medium having an automatic translation program recorded thereon, the automatic translation program causing a computer to execute: a original inputting step of inputting an original to be translated; a morphological analyzing step of dividing a sequence of morphemes from the original inputted by the original inputting step; a converting step of converting the morphemes to conceptual categories divided by the morphological analyzing step to be output; a typical sentence verifying step of verifying whether or not a string of predetermined typical conceptual categories exists in a sequence of the conceptual categories outputted from the converting step; and a replacing step of generating a pattern of a predetermined translated sentence corresponding to the string of the conceptual categories to replace the pattern of the predetermined translated sentence with translated words corresponding to the original morphemes of the conceptual categories constituting the pattern of the translated sentence when the string of predetermined typical conceptual categories exists in the sequence of the conceptual categories is determined by the typical sentence verifying step.

According to the second aspect, the converting step converts the divided morphemes to the conceptual categories by referring to the vocabulary information file that defines the relationship between the conceptual categories and the morphemes contained therein. The typical sentence verifying step performs the verification by referring to the first table that stores a pair of the string of the predetermined conceptual categories and the pattern of the predetermined translated sentence corresponding to the string. The replacing step generates a pattern of a predetermined translated sentence corresponding to the string of the conceptual categories by referring to the first table and performs replacement by referring to a second table that stores a pair of the morpheme constituting the pattern of the translated sentence and the predetermined translated word corresponding to the morpheme.

In this case, the above computer may include a machine designed for a specific processing such as an automatic translator and the like other than the configuration of the general-purpose computer including the configuration of a central processing unit. Namely, the computer is not specially limited if the configuration of the central processing unit is provided.

When the above program is read onto the computer from such recording medium and executed, the aforementioned steps are executed.

Furthermore, it is preferable that at least one of the vocabulary information file, first table and second table be defined or set by user. his makes it possible to carry out the automatic translation of the typical sentences in various kinds of fields by the present configuration.

It is noted that a part of the respective procedures of the second aspect may be implemented by a procedure incorporated into the computer (a procedure that is incorporated into the computer in view of hardware is possible and an operating system that is incorporated into the computer or a procedure that is implemented by other application program is possible). Then, the program recorded onto the recording medium may include a command for calling or linking the procedure implemented by the computer. The part of the defined procedures can be executed by the part of the procedures of the operating system and the like. A program for implementing a procedure or a module is not directly recorded onto the recording medium. However, if the part of the procedures of the operating system for attaining these procedures is called or linked, it is possible to obtain substantially the same configuration as the case in which the program for implementing the procedure or the module is directly recorded onto the recording medium.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The preferred embodiment of this invention will be specifically explained with reference to the accompanying drawings. In the explanation hereinafter, a program for executing an automatic translation is recorded on a CD-ROM (Compact Disk Read Only Memory), which is a recording medium, and this CD-ROM is read by a personal computer and the other general apparatuses, whereby providing these apparatuses as an automatic translator of the present invention. It is noted that the present invention is not limited to the configuration of this embodiment, and the present invention may be configured as an apparatus dedicated to an automatic translator.

Figure 2:
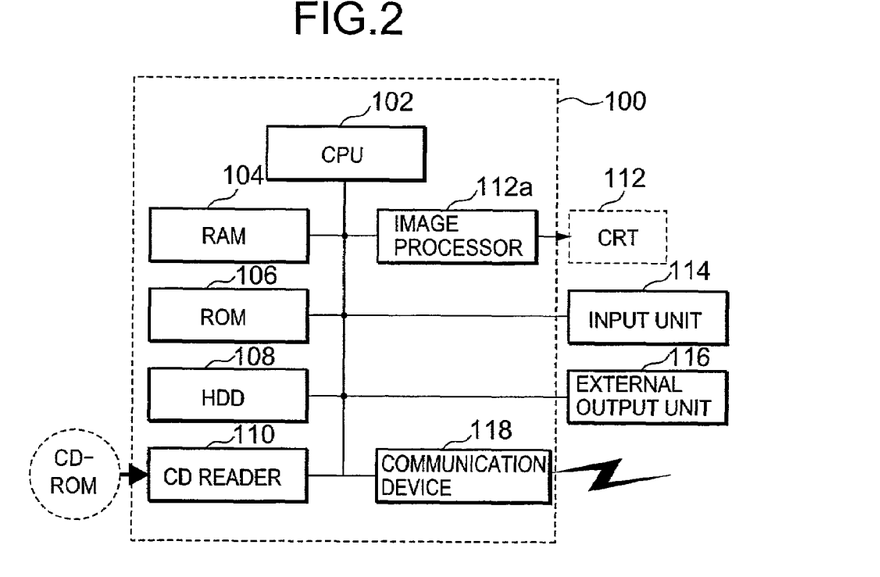
FIG. 2 is a block diagram illustrating a system configuration of an automatic translator according to an embodiment of the present invention.

FIG. 2 is a block diagram illustrating a system configuration of an automatic translator according to an embodiment of the present invention. As illustrated in this figure, a main system 100 comprises outer storage units such as a CPU (Central Processing Unit) 102, a RAM (Random Access Memory) 104, a ROM (Read Only Memory) 106, a HDD (Hard Disk Drive) 108, a CD (Compact Disk) reader 110, which constitutes a part of the outer storage units, a CRT (Cathode-Ray Tube) 112 connected via an image processor 112a, an input unit 114, an external output unit 116, and a communication device 118, and the respective units are connected to one another by a bus.

The CPU 102 executes various kinds of processing such as execution of the program, control of the respective units of the main system 100 based on the program read from the CD-ROM and data stored in the HDD 108.

The RAM 104 forms a storing area for storing various kinds of data including the program read from the CD-ROM via the CD-ROM reader 110 and a processing result of CPU 102 and the like.

The HDD 108 is a configuration for reading the program stored in the CD-ROM and data from the CD reader 110 and storing them therein by a user's installing operation, and providing a working area for CPU 102 as required. Moreover, the HDD 108 itself may serve as a recording medium of the present invention by the aforementioned installation in some cases.

The CD reader 110 reads the program and data from the CD-ROM, and is composed of a CD-ROM drive and a CD-ROM buffer in terms of hardware. The CD-ROM stores an automatic translation program including a program for implementing the present invention and various kinds of data (including various kinds of dictionaries and table data to be described later).

The image processor 112a performs processing for generating text characters and other image data based on a processing result obtained by the CPU 102. Image data generated by the image processor 112a is outputted to the CRT 112 and displayed thereon.

The input unit 114 is made up of a keyboard and a pointing device (mouse), and performs input of characters, input of data, input of various kinds of instructions (including input of commands).

The other external output unit 116 is formed of a printer, and the user prints out a processing result outputted by the CRT 112 as required.

The communication device 118 is a configuration for implementing a local area network (LAN) between the main system 100 and the other system configuration (not shown), whereby transferring the program, various kinds of commands or various kinds of data.

According to this configuration, when a power switch of the main system 100 is turned on and the CD-ROM is set, the respective parts of the main system 100 are initialized. When the program is ready to be loaded, the automatic translation program including the configuration of the present invention and relevant data are read from the CD reader 110 by the CPU 102. Then, they are once installed into the HDD 108. The program read by the CPU 102 and stored in the RAM 104 is executed by the CPU 102, whereby implementing the automatic translator of the present invention.

Figure 3:
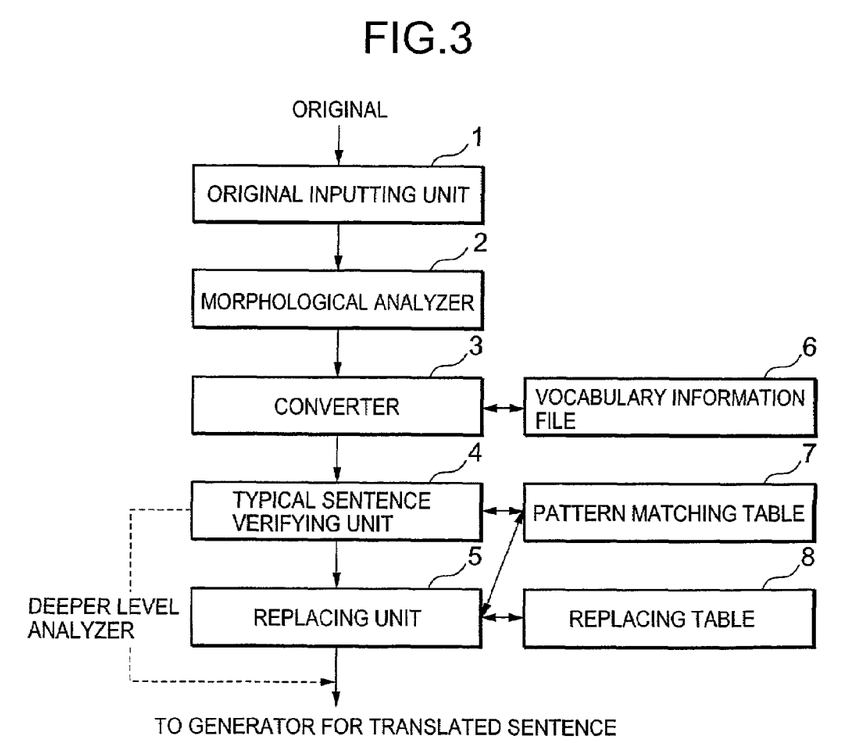
FIG. 3 is a block diagram illustrating a functional configuration of the automatic translator according to the embodiment of the present invention.

FIG. 3 is a block diagram illustrating a functional configuration of the automatic translator of this embodiment, which is generated on the main system 100 when the CPU 102 executes the reading of the translation program for implementing the configuration of the present invention from the CD-ROM, which is the recording medium.

The automatic translator of this embodiment comprises an original inputting unit 1, a morphological analyzer 2, a converter 3, a typical sentence verifying unit 4, and a replacing unit 5. The original inputting unit 1 inputs an original from another translation software, which is started up on the main system 100 together with the main translation program. The morphological analyzer 2 divides the original inputted into the original inputting unit 1 to morphemes. The converter 3 converts the morphemes divided by the morphological analyzer 2 to conceptual categories. The typical sentence verifying unit 4 verifies whether or not a string of predetermined typical conceptual categories is present in a sequence of the conceptual categories converted by the converter 3. The replacing unit 5 generates a pattern of a predetermined translated-sentence corresponding to the string of the conceptual categories when the string of typical conceptual categories is present in the sequence of the conceptual categories to replace it with translated words corresponding to the original morphemes of the conceptual categories constituting the pattern of the translated-sentence.

Moreover, the converter 3 comprises a vocabulary information file 6 that defines the relationship between the conceptual categories and the morphemes contained therein, which is checked thereby. Also, the typical sentence verifying unit 4 comprises a pattern matching table 7 that stores a pair of the string of the predetermined conceptual categories and the pattern of the predetermined translated-sentence corresponding to the string, which is checked thereby. Furthermore, the replacing unit 5 comprises a replacing table 8 that stores a pair of the morpheme constituting the pattern of the translated sentence and predetermined translated word corresponding to the morpheme, which is checked thereby.

The following will explain the basic functions of the automatic translator of this embodiment.

The original to be translated is copied onto a clip board from the aforementioned another translation software when the operator performs an operation such as cut and paste, and it is inputted to the automatic translator of the main system 100 by the original inputting unit 1 via the clip board. The above input processing may input the entirety of the original or divide the original into appropriate input units and input them from a logical or physical standpoint.

The input original is divided into a sequence of morphemes, and the sequence of the divided morphemes is inputted into the converter 3.

The converter 3 converts the morphemes to the conceptual categories to be outputted. As mentioned above, only from the division to the sequence of morphemes, it is unclear whether or not the translation (replace processing) is should be carried out by the main system 100. In this point, the sequence of morphemes can be regarded as a train of notations, which is obtained by dividing the original character string in a minimum semantic unit in view of the outline, and as a train of conceptual categories in view of the meaning. As a precondition for which the typical sentence verifying unit 4 verifies the string of conceptual categories to determine whether or not the translation is should be carried out by the main system 100, the converter 3 converts the morphemes to the conceptual categories to generate the sequence of conceptual categories.

The conversion of the morphemes to the conceptual categories by the converter 3 results in that the divided morphemes are checked against the vocabulary information file 6, which is formed of a specific library, to be extracted as conceptual categories. In the vocabulary information file 6, a definition is given to predetermined conceptual category (for example, a denotative definition that lists all elements and a connotative definition that describes restriction which each element should satisfy). Then, in a case where a target morpheme satisfies condition of each definition, the conceptual category defined by the definition is extracted. According to this configuration, there is provided a user interface in which a user can freely define the conceptual categories in the vocabulary information file 6 to improve a conversion ratio from the morphemes to the conceptual categories.

The typical sentence verifying unit 4 verifies whether or not the sequence of the conceptual categories indicative of semantic information has a fixed regularity, that is, there is a string of predetermined typical conceptual categories in the sequence of the conceptual categories. At the time of this verification processing, the typical sentence verifying unit 4 searches the pattern matching table 7 using the sequence of the conceptual categories or an arbitrary partial sequence thereof as a key.

As a result of the verification including the above search processing, hen there is no string of the predetermined typical conceptual categories in the sequence of the conceptual categories, the sequence of the original morphemes corresponding to the sequence of the conceptual categories is all sent to the deeper-level analyzer in another translation software aforementioned. The deeper-level analyzer is the same as the configuration of the aforementioned conventional automatic translator, and the explanation is omitted.

As a result of the verification, when there is a string of the predetermined typical conceptual categories in the sequence of the conceptual categories, the sequence of the conceptual categories is sent to the replacing unit 5, and the replacing unit 5 generates a predetermined translated sentence corresponding to the string of the conceptual categories. In the pattern matching table 7, only the string (pattern) of the typical conceptual categories is not stored. Namely, the pattern of the predetermined translated sentence corresponding to the string is paired therewith and stored. Accordingly, the replacing unit 5 generates the pattern of the predetermined translated sentence corresponding to the string of the conceptual categories by referring to the pattern matching table 7.

The replacing unit 5 performs replacement with the translated words corresponding to the original morphemes of the conceptual categories constituting the pattern of the translated-sentence by referring to the replacing table 8 that stores the pair of the morpheme constituting the translated-sentence pattern and the predetermined word corresponding to the morpheme.

While, the part, excepting the portion where the string of the typical conceptual categories exists in the sequence of conceptual categories, is subjected to insertion of an identification code and the like in order to recognize a portion where the pattern of the corresponding typical conceptual category exists and the resultant is all sent to the deeper-level analyzer.

Figure 4:
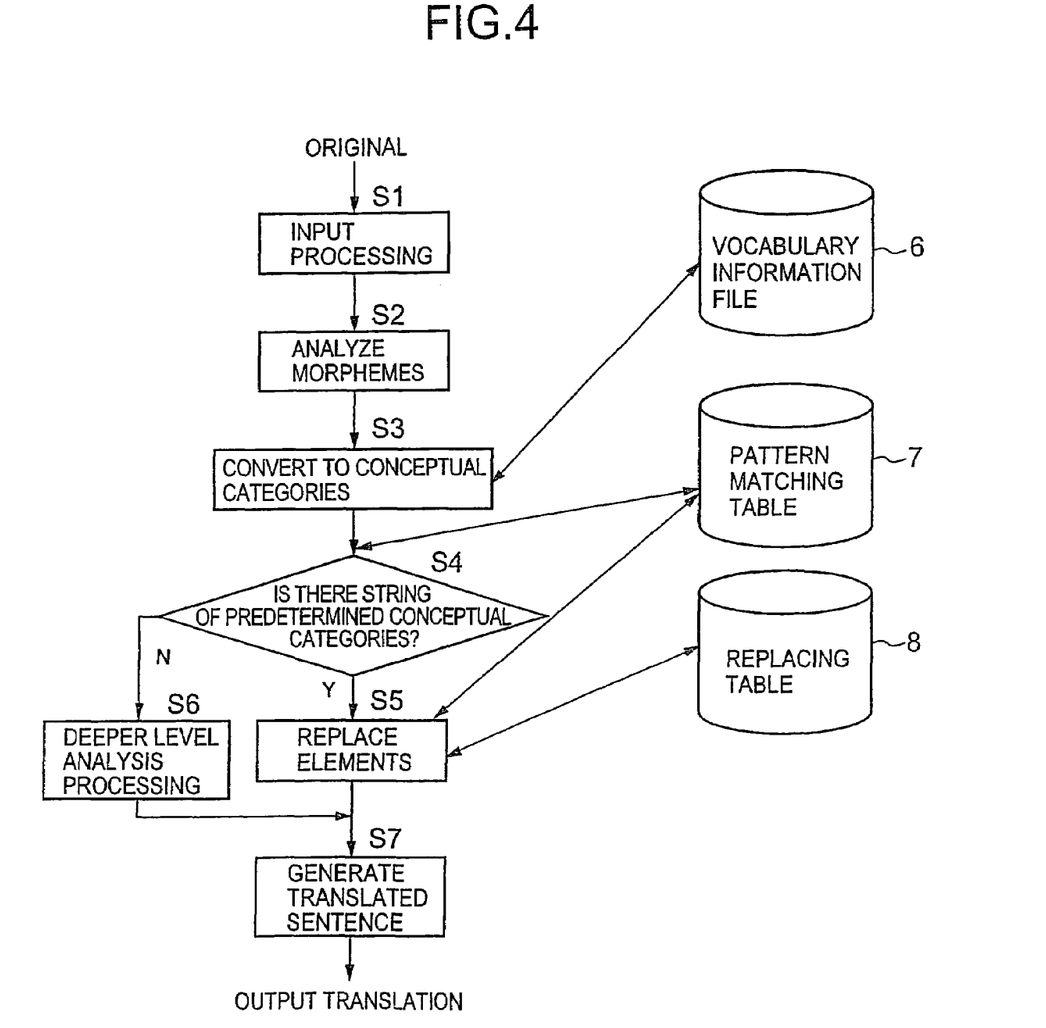
FIG. 4 is a procedure explanatory view for explaining an operation of the automatic translator according to the embodiment of the present invention.

FIG. 4 is a flowchart illustrating an operation of a specific example of the automatic translator according to the embodiment of the present invention. The following will explain the operation of the specific example the automatic translator according to the embodiment of the present invention using the flowchart of FIG. 4 with reference to FIG. 3.

First, in step S1, the original inputting unit 1 inputs the original to be translated.

Next, in step S2, the morphological analyzer 2 analyzes the entirety of the inputted original or a predetermined processing unit, divides it to the sequence of morphemes and sends it to the converter 3. Then, in step S3, the converter 3 converts the individual morphemes to the conceptual categories by referring to the vocabulary information file 6.

Moreover, in step S4, the typical sentence verifying unit 4 searches the pattern matching table 7 to verify whether or not there is a string of the typical conceptual category exists in the converted conceptual categories. More specifically, the typical sentence verifying unit 4 searches the pattern matching table 7 using the sequence of the conceptual categories or an arbitrary partial sequence thereof as a key.

When there is no string of the typical conceptual categories in the sequence of the conceptual categories, the sequence of the morphemes divided is sent to the deeper level analysis processing in step S6.

While, there is a string of the typical conceptual categories therein, the sequence of the conceptual categories is sent to the replacing unit 5. In step S5, by referring to the pattern matching table 7, the replacing unit 5 extracts the sequence of the conceptual categories as a pattern of the predetermined translated sentence which is stored in the table 7 to be paired with the string of the typical conceptual categories and which corresponds to the string, whereby carrying out the generation of the pattern of the predetermined translated sentence. Then, the replacing unit 5 performs replacement with the translated words corresponding to the original morphemes of the conceptual categories constituting the pattern of the translated sentence by referring to the replacing table 8.

The translation in which the aforementioned replace processing is completed is sent to a processor for executing another translation software that carries out a generation of a final translated sentence via the clipboard. Another translation software is the same as the analyzer adopted in the conventional automatic translator, and the explanation is omitted.

Thus, in the original to be translated, the typical part, indicative of time and date, is translated by the present configuration. The part, which is determined as a non-target part of the translation using present configuration by the typical sentence verifying unit 4, is translated by the processor for executing another translation software, which has been started up together with the present configuration (step S6). Then, both translation results are added to generate a translated sentence and output it as a translation (step S7).

The following will explain the operation of each of the converter 3 that converts the morphemes to the conceptual categories using the vocabulary information file 6, the typical sentence verifying unit 4 that refers to the pattern matching table 7, and the replacing unit 5 with reference to the specific example.

This specific example will explain a case in which the converter 3 converts the morphemes to the conceptual categories and the typical sentence verifying unit verifies whether or not there is the string of the predetermined typical conceptual categories in the sequence of the conceptual categories.

TABLE 1 shown below is a list of vocabulary information film 6 that stores vocabulary information of the aforementioned categories in a case where the typical sentence to be translated relates to date and day of the week.

TABLE 1

| NAME | EXPLANATION | ATTRIBUTE | ELEMENT |
|---|---|---|---|
| FULL-LENGTH DAY OF THE WEEK | NAME OF UN-ABBREVIATED DAY OF THE WEEK | CHARACTER STRING | SUNDAY, MONDAY, TUESDAY, ... |
| SHORT-LENGTH DAY OF THE WEEK | NAME OF ABBREVIATED DAY OF THE WEEK | CHARACTER STRING | SUN, MON, TUE ... |
| FULL-LENGTH MONTH | NAME OF UN-ABBREVIATED MONTH | CHARACTER STRING | JANUARY, FEBRUARY, MARCH, ... |
| SHORT-LENGTH MONTH | NAME OF ABBREVIATED MONTH | CHARACTER STRING | JAN, FEB, MAR, ... |
| DAY 02 | DAY | NUMERICAL VALUE | TWO-DIGIT NUMERAL VALUE RANGE: 1 TO 31 |
| FULL-LENGTH YEAR | YEAR WRITTEN BY FOUR DIGITS | NUMERICAL VALUE | FOUR-DIGIT NUMERICAL VALUE |
| SHORT-LENGTH YEAR | YEAR WRITTEN TWO DIGITS | NUMERICAL VALUE | TWO-DIGIT NUMERICAL VALUE |

The reason why the morphemes are once converted to the conceptual categories by the converter 3 is as follows:

Namely, if the morphemes remain as they are extracted by the morphological analysis of the original, it is unclear as to whether or not translation processing, which has been simplified by the configuration of the present invention, should be carried out. Moreover, the conversion is needed when the morphemes are more abstracted in terms of the meaning (dominant concept), and whether or not the dominant concept has a fixed pattern is determined by the typical sentence verifying unit 4

The sequence of morphemes can be regarded as a train of notations, which is obtained by dividing the original character string in a minimum semantic unit in view of the outline, and as a train of conceptual categories in view of the meaning. Accordingly, the conversion to the conceptual categories from the morphemes by the converter 3 is executed by checking the divided morphemes against the vocabulary information file 6 formed of a specific library to extract them as conceptual categories. As mentioned above, in the vocabulary information file 6, a definition is given to a predetermined conceptual category (for example, a denotative definition that lists all elements and a connotative definition that describes restriction which each element should satisfy). Then, in a case where a target morpheme satisfies condition of each definition, the conceptual category defined by the definition is extracted.

The converter 3 converts the morphemes to the conceptual categories as referring to the vocabulary information file 6 of TABLE 1 as a preparation stage for which the typical sentence verifying unit 4 verifies the typical sentence as referring to the pattern matching table 7. The sequence of the morphemes thus converted is extracted as a sequence of conceptual categories.

Since the conversion processing is continued as far as the convertible morpheme continuously appears, the morphemes are extracted as a sequence of the conceptual categories at the time when the inconvertible morpheme appears. Such division of the sequence of the conceptual categories is carried out with respect to the entirety of the sequence of morphemes as a target. Accordingly, there is a case in which the number of sequences of the conceptual categories to be divided is more than one.

Furthermore, the typical sentence verifying unit 4 uses one sequence or each of two or more sequences of the conceptual categories divided as a key, and compares it with each string of the predetermined conceptual categories prestored in the pattern matching table 7 of Table 2 shown below to verify whether or not there is a pattern matching.

TABLE 2

| | |
|---|---|
| ENGLISH | [SHORT-LENGTH DAY OF THE WEEK] [COMMA] [DAY 02] [SHORT-LENGTH MONTH] [FULL-LENGTH YEAR] |
| JAPANESE | [FULL-LENGTH YEAR] YEAR [SHORT-LENGTH MONTH] MONTH [DAY 02] DAY ([SHORT-LENGTH DAY OF THE WEEK]) |
| ENGLISH | [SHORT-LENGTH MONTH] [DAY 02] [COMMA] [FULL-LENGTH YEAR] |
| JAPANESE | [FULL-LENGTH YEAR] YEAR [FULL-LENGTH MONTH] MONTH [DAY 02] DAY |
| . | . |
| . | . |
| . | . |

In the verification processing, when there is a string of the predetermined conceptual categories that matches a string of one or two or more conceptual categories divided, the result is sent to the replacing unit 5.

The replacing unit 5 further checks the pattern matching table 7 and outputs the corresponding pattern prestored in TABLE 2 (translate sentence stored as Japanese in TABLE 2) as a pattern of the translated sentence corresponding to the string of the corresponding predetermined conceptual categories (string of the conceptual categories stored as English in TABLE 2).

In the pattern of this translated sentence, the string of the morphemes is changed in a predetermined order as required and a necessary subscription is added at this time. For example, the string of the conceptual categories, that is, [short-length day of the week] [comma] [day 02] [short-length month] [full-length year] indicated in the English part at the first stage of TABLE 2 is changed to [full-length year] [short-length month] [day 02] [short-length day of the week] indicated in the Japanese part therebelow in order and subscripts such as "year" "month" "day" "( )" and the like are added after each conceptual category or therearound.

Then, the replacing unit 5 performs replacement with the translated words corresponding to the original morphemes of the conceptual categories constituting the pattern of the translated sentence. In other words, the conceptual categories ([full-length year] [short-length month] [day 02] [short-length day of the week] in the example at the upper stage of TABLE 2) constituting the pattern of the translated sentence are so abstract that they cannot be outputted directly. For this reason, the replacing unit 5 returns the conceptual categories to the original morphemes and replaces the respective morphemes with the corresponding translated words. At the time of the replace processing, the replacing tables 8 illustrated in TABLES 3 and 4 are used.

TABLE 3

| JAPANESE | ENGLISH |
|---|---|
| 日 (NICHI) | SUN |
| 月 | MON |
| 火 | TUE |

TABLE 4

| JAPANESE | ENGLISH |
|---|---|
| 日曜日 (NICHTYOUBI) | SUNDAY |
| 月曜日 (GETSUYOUBI) | MONDAY |
| 火曜日 (KAYOUBI) | TUESDAY |

For example, in the case of the character string indicative of date and day of the week such as "Thu, 09 Jul. 1998", the sequence of the conceptual categories converted by the converter 3 becomes [short-length day of the week] [comma] [day 02] [short-length month] [full-length year]. This matches the English part at the upper stage by checking it against the pattern matching table 7 by the typical sentence verifying section 4. Accordingly, the replacing unit 5 generates the part just below the English part at the upper state of TABLE 2, that is, [full-length year] year [short-length month] month [day 02] day [short-length day of the week] as the pattern of the translated sentence. Moreover, the replacing unit 5 returns these conceptual categories to the original morphemes, ⌈1998⌋ ⌈Jul.⌋ ⌈09⌋ ⌈Thu⌋ are obtained. Among these morphemes, "July" and "Thu" are contracted forms in English notation, and their translations are not performed. Then, they are respectively replaced with "July"→"7", "Thu"→"木(moku)" with reference to the replacing table 8 as in TABLE 3and TABLE 4. As a result, this is outputted as 1998 年(nen)07月(gatsu)09 日(nichi) (木) (moku).

Regarding the deeper level analyzer and the translation sentence generator, according to this embodiment, they are operated by another translation software, which has prepared separately from the configuration of the present invention and started up therewith. Namely, in the original to be translated, the typical part, indicative of time and date, is translated by the present configuration. The part, which is determined as a non-target part of the translation using present configuration by the typical sentence verifying section 4, is translated by another translation software started up therewith. Then, both translation results are added to generate a translated sentence, and output it as a translation.

Though it is explained that the deeper level analyzer and the translated sentence generator are operated by another translation software different from the configuration of the present invention, the deeper level analyzer and the translated sentence generator may be included as a structural element of the present invention.

The respective tables to which the typical sentence verifying unit 4 and the replacing unit 5 refer are not limited to the configuration corresponding to the sequential search from the top entry of the tables. It is possible to provide such contrivance that allows high-speed search to be carried out at the searching time (for example, the entry contents to be stored are arranged in alphabetical order, or a hash function is worked).

Moreover, the program that performs each processing illustrated in the flowchart of FIG. 4 may be stored in not only the CD-ROM but also computer-readable storage medium such as a floppy disk, a magnetic tape and the like to be provided. Then, a computer that includes at least a personal computer and a general-purpose computer in its category may read the above program and execute it.

The automatic translator of the present invention is not limited to the aforementioned embodiment, and various changes may be, of course, added thereto without departing from the broad spirit and scope of the invention.

For example, in the pattern matching table 7 provided in the typical sentence verifying section 4, only the string of the predetermined conceptual categories are stored, and the pattern of the predetermined translated sentence corresponding to the string is stored in another table of the replacing unit 5. When the typical sentence verifying section 4 verifies the existence of the string of the typical conceptual categories at the matching in the pattern matching table 7, the replacing unit 5 can generate the pattern of the predetermined translated sentence corresponding to the string of the conceptual categories by referring to the table prepared separately from the pattern matching table 7.

Furthermore, the configuration of the typical sentence verifying unit 4 and that of the replacing unit 5 may be formed as one configuration. In the case of one configuration, processing such as verification whether or not there is the string of the typical conceptual categories and the generation of the pattern of the predetermined translated sentence corresponding to the string of the conceptual categories and the replacement with the translated words corresponding to the original morphemes of the conceptual categories constituting the pattern of the translated sentence will be carried out together. This eliminates the need for separately providing the table to be used to verify whether or not the string of the typical conceptual categories exists and the table to be used to generate the pattern of the predetermined sentence corresponding to the string of the conceptual categories. Namely, the configuration of such pattern matching table 7 may be used, whereby resulting in an increase in efficiency.

As explained above, according to the present invention, regarding the case in which the typical sentence is included in the original and the translation result of the typical sentence can be decided based on the simple corresponding relationship between the typical sentence and the translated sentence, the translation relating to only the corresponding part is translated by the present configuration and the result does not have to be sent to the deeper level analyzer. This makes it possible to reduce the length of the original to be sent to the deeper level analyzer in connection with the translation of the entirety of the original. As a result, the possibility that erroneous translation will occur is decreased and processing time required for translation can be shortened.

Unlike the automatic translator disclosed in Japanese Patent Unexamined Publication No. 64-31269, translation processing, which is based on the word-to-word simple correspondence, is not carried out. Instead, there is performed processing wherein the morphemes are once converted to the dominant conception, that is, the conceptual categories, to detect the string of the predetermined conceptual categories from the sequence of the conceptual categories, making it possible to automatically execute translation with few errors at high speed by the present configuration. This makes it unnecessary for the operator to preregister translated words, with the result that user interface is especially improved.

Furthermore, the specifications of the vocabulary information file for converting the morphemes to the conceptual categories, the pattern matching table, the replacing table and the like are clarified so that the user can freely execute definition or the setting. This makes it possible to carry out the automatic translation using the present configuration with respect to not only the typical sentence indicative of time and date shown in this embodiment but also the other typical sentences (in the other field), whereby bringing about advantages in terms of the reduction in the possibility of erroneous translation and the translation speed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An automatic translator, comprising:
    original inputting means for inputting an original character string to be translated;
    morphological analyzing means for dividing a sequence of morphemes from the original character string inputted by the original inputting means;
    converting means for converting the morphemes to conceptual categories to be output;
    typical sentence verifying means for verifying whether a string of predetermined typical conceptual categories exists in a sequence of the conceptual categories outputted from the converting means; and
    replacing means for generating a pattern of a predetermined translated sentence corresponding to the string of the conceptual categories to replace the pattern of the predetermined translated sentence with translated words corresponding to original morphemes of the conceptual categories constituting the pattern of the translated sentence when the string of predetermined typical conceptual categories is determined to exist in the sequence of the conceptual categories by the typical sentence verifying means,
    wherein the converting means has a vocabulary information file that defines a relationship between the conceptual categories and the morphemes contained therein, the typical sentence verifying means has a first table that stores a pair of the string of the predetermined conceptual categories and the pattern of the predetermined translated sentence corresponding to the string, and the replacing means has a second table that stores a pair of the morpheme constituting the pattern of the translated sentence and the predetermined translated word corresponding to the morpheme.

2. The automatic translator according to claim 1, wherein at least one of the vocabulary information file, first table and second table is defined or set by a user.

3. A computer-readable storage medium having an automatic translation program recorded thereon, the automatic translation program causing a computer to execute operations, comprising:
    inputting an original to be translated;
    dividing a sequence of morphemes from the original inputted using a morphological analysis;
    converting the morphemes divided by the morphological analysis to conceptual categories and outputting the conceptual categories;
    verifying whether a string of predetermined typical conceptual categories exists in a sequence of the conceptual categories outputted; and
    generating a pattern of a predetermined translated sentence corresponding to the string of the conceptual categories to replace the pattern of the predetermined translated sentence with translated words corresponding to the original morphemes of the conceptual categories constituting the pattern of the translated sentence when the string of predetermined typical conceptual categories is determined to exist in the sequence of the conceptual categories, wherein the operations are executed in accordance with a vocabulary information file defining a relationship between the conceptual categories and the morphemes contained therein, a first table storing a pair of the string of the predetermined conceptual categories and the pattern of the predetermined translated sentence corresponding to the string is used for the verifying, and a second table storing a pair of the morpheme constituting the pattern of the translated sentence and the predetermined translated word corresponding to the morpheme.

4. The computer-readable storage medium according to claim 3, wherein at least one of the vocabulary information file, first table and second table is defined or set by a user.

5. A method of automatically translating an original text, comprising:

linking a string of predetermined conceptual categories with morphemes contained therein and a pattern of predetermined translated sentences corresponding to the string;

converting a sequence of morphemes of the original text to conceptual categories and determining whether the string of the predetermined conceptual categories exists in the converted conceptual categories; and generating a pattern of a translated sentence for a string of the conceptual categories and replacing the pattern of the translated sentence with translated words corresponding to the sequence of morphemes of the translated sentence in accordance with the linkage upon determining that the string of the predetermined typical conceptual categories exists in the converted conceptual categories.

* * * * *